United States Patent [19]
Yasui

[11] Patent Number: 5,881,459
[45] Date of Patent: *Mar. 16, 1999

[54] PRESSURE COMMUNICATION FOR SUPERPLASTICALLY FORMED, DIFFUSION BONDED PANELS AND METHOD OF MANUFACTURE

[75] Inventor: Ken K. Yasui, Huntington Beach, Calif.

[73] Assignee: McDonnell Douglas Corporation, Huntington Beach, Calif.

[ * ] Notice: The term of this patent shall not extend beyond the expiration date of Pat. No. 5,850,722.

[21] Appl. No.: 721,479

[22] Filed: Sep. 27, 1996

[51] Int. Cl.⁶ .............................. B23P 17/00; E04C 2/32; B21D 22/10; B23K 31/02
[52] U.S. Cl. .................. 29/897.32; 29/421.1; 52/784.15; 72/61; 228/190
[58] Field of Search .............................. 29/897.32, 421.1; 228/157, 190, 193; 72/61; 52/784.15, 783.14, 783.15, 783.16, 783.19

[56] References Cited

U.S. PATENT DOCUMENTS

| | | |
|---|---|---|
| 4,292,375 | 9/1981 | Ko . |
| 4,331,284 | 5/1982 | Schulz et al. . |
| 4,934,580 | 6/1990 | Sutton . |
| 5,204,161 | 4/1993 | Pettit et al. .............................. 228/157 |
| 5,240,376 | 8/1993 | Velicki . |
| 5,323,953 | 6/1994 | Adderley et al. . |
| 5,330,093 | 7/1994 | Bottomley et al. ...................... 228/157 |
| 5,366,787 | 11/1994 | Yasui et al. .............................. 228/157 |
| 5,715,644 | 2/1998 | Yasui ....................................... 228/157 |
| 5,723,225 | 3/1998 | Yasui et al. .............................. 228/157 |

*Primary Examiner*—Paul T. Sewell
*Assistant Examiner*—Jila Mohandesi
*Attorney, Agent, or Firm*—Alston & Bird LLP

[57] ABSTRACT

The method of forming SPF/DB structures having reinforcement webs that are constructed by welding two or more sheets together along an interrupted seam and placing the core so formed between two face sheets, expanding the face sheets into a die by providing pressurized inert gas through one of the face sheets and through a pressure equalization hole drilled through a sealed area formed by the seam, and using pressurized inert gas to expand the core sheets into webs that extend between the face sheets.

20 Claims, 14 Drawing Sheets

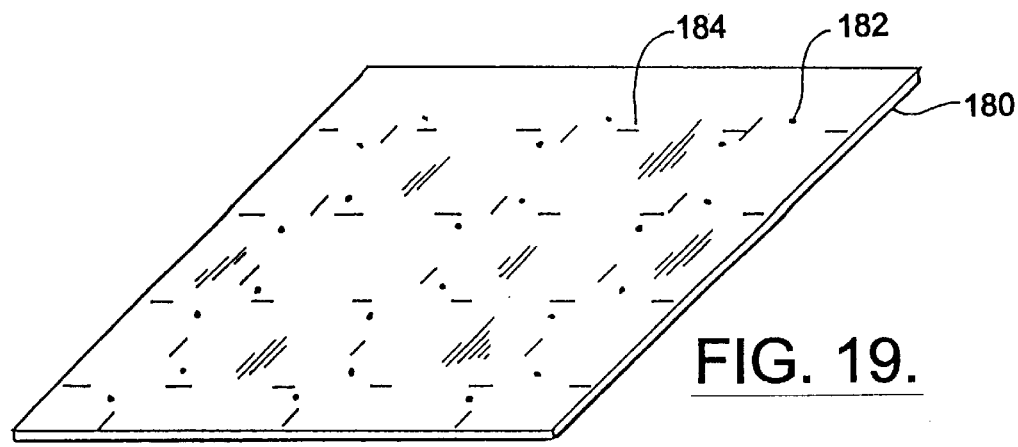
FIG. 19.
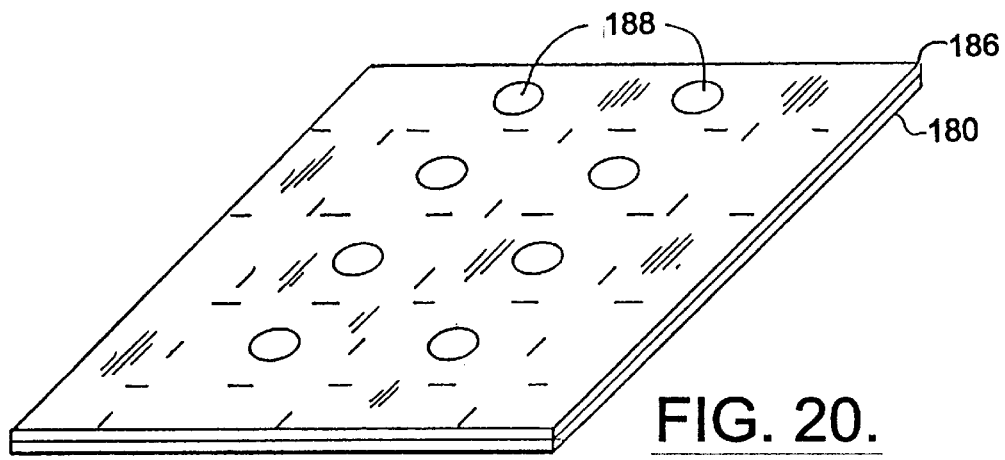
FIG. 20.
FIG. 21.
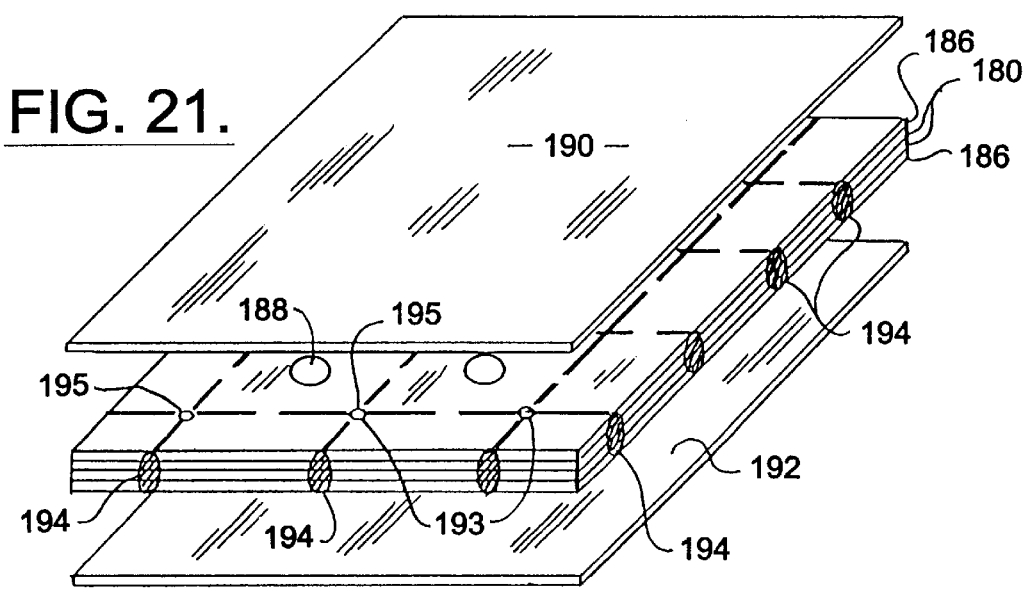

PRESSURE COMMUNICATION FOR SUPERPLASTICALLY FORMED, DIFFUSION BONDED PANELS AND METHOD OF MANUFACTURE

BACKGROUND OF THE INVENTION.

Superplasticity is the characteristic demonstrated by certain metals to develop unusually high tensile elongation with minimum necking when formed within a limited temperature and strain-rate range. This characteristic, peculiar to certain metal and metal alloys, has been known in the art as applied to production of complex shapes. It is further known that at superplastic-forming temperatures, the same materials can be diffusion-bonded by forcing clean contacting surfaces together.

Many prior art processes and structures use diffusion bonding and superplastic forming, such as shown in: Hamilton et al., U.S. Pat. No. 3,927,817; Ko, U.S. Pat. No. 4,292,375; Rainville, U.S. Pat. No. 4,530,197; Cooper et al., U.S. Pat. No. 5,069,383; and Bottomley et al., U.S. Pat. No. 5,330,093 which must include a maskant or "stop off" material to prevent unwanted bonding, and Blair, U.S. Pat. No. 4,318,965; Violette et al., U.S. Pat. No. 5,129,787; Gregg et al., U.S. Pat. No. 5,330,092; Matsen, U.S. Pat. No. 5,420,400; and Gregg et al., U.S. Pat. No. 5,451,472 which disclose superplastically formed diagonally reinforced structures and the processes to construct the same.

As shown in Hayase, et al., U.S. Pat. No. 4,217,397, four sheets of superplastically formable material, such as titanium alloy can be used to provide a metallic sandwich structure. Generally, two or three contiguous work sheets are joined together by a distinct continuous seam weld in a pre-selected pattern, which determines the geometry of the structure of the core to be produced. An expandable envelope is formed by sealing the perimeter of the joined sheets. The joined and unjoined work sheets are then placed in a stacked relationship and contained in a limiting fixture or die. The space between the upper and lower limiting fixture members determines the height and shape of the sandwich structure that ultimately results. At least one of the work sheets is then superplastically formed against the other work sheet, to which it becomes diffusion-bonded to form the desired sandwich structure.

A particularly advantageous structure that can be formed is a four-sheet. structure (two face sheets and two core sheets) that ultimately results in two generally parallel face-sheets with perpendicular webs extending therebetween. The face sheets, are formed first and held in a proper final position inside forming dies in a hot press by pressure applied between the core sheets and the face sheets, while pressure is also applied between the core sheets to prevent them from bonding together. The webs are then formed by increasing the pressure between the two core sheets. The core sheets are welded together along seams there between, with at least one area of each seam where the weld is interrupted so that gas pressure can propagate between the welded core sheets. When pressurized during a superplastic forming operation, the spaces between the seams of the two core sheets expand into balloon-like structures until they contact the face sheets and can expand outwardly no further. Application of continuing pressure causes the balloon-like structures to assume square shapes with the seams being positioned halfway between the face sheets on what become perpendicular webs. The core sheet portions adjacent the webs ultimately are formed 90° into contact with each other, and diffusion-bonded together into a single web structure. Additional core sheets can be included to form diagonal reinforcing ribs, and portions can be reinforced by suitably placed doubler strips and other reinforcements.

In the past, two approaches have been used to apply face sheet pressure to properly expand the face sheets against the hot die and retain them against the die as the core is expanded. One was welding a number of pressure tubes at the edges of the sheets for applying the pressure to each face sheet. The other was creating internal face sheet pressure ways by cutting sheets and welding selected areas. Both approaches are time consuming and lack reliability. Quite often, incomplete formings have been caused by leakage from weld cracks or gas passage blockages.

Therefore, there has been a need to improve the basic face sheet and expanded core sheet SPF/DB process so that the face sheets can be formed and retained reliably and easily.

BRIEF DESCRIPTION OF THE INVENTION.

In the present process, one or more gas passages are drilled through the core sheets at one or more sealed locations formed by seam welds in the core to create one or more gas passages that extend through the core but does not communicate with the interior of the core. This allows face sheet pressure to flow through the core and equalize about the core from a single location either above or below the core during face sheet formation and retention without interrupting the pressure seal of the core that allows its later formation. The present invention is especially advantageous when the dies used, establish all of the gas passages to the forming pack, thereby eliminating the requirement for welding tubes to the pack, and in some cases eliminating all fusion welding except resistance seam welding, which is relatively simple and reliable.

In forming the stack of sheets to perform the present process, each of the web forming sheets in the initial core assembly pack is connected to an adjacent web forming sheet with an interrupted weld seam to form an inner core assembly. If only longitudinal webs are to be formed, usually spaced parallel weld beads are used. If box shaped cells with both longitudinal and transverse webs are to be formed, then a criss-cross of interrupted weld seams are formed. At least one hole is then drilled through the center of at least one of the seams to provide a gas passageway between the outside surfaces of the web forming core sheets that does not connect to the interior of the core assembly. Alternatively, an area is surrounded and sealed by seam welds and the hole is drilled through the sealed area. The face sheets are added to the stack and the edges of all the sheets are sealed with a first pressure line connected to the area between the outside of the core assembly and the face sheets, and a second pressure line connected to the inner core. This assembly is then placed in a die in a hot press, the assembly is heated to about 1650° F. (for Ti-6Al-4V titanium alloy) and a controlled flow of inert gas is introduced between the inner core and the face sheets to superplastically form the face sheets to the shape of the die. The core sheet forming may be gas-mass controlled as discussed in Yasui, U.S. Pat. No. 5,129,248 and face sheet forming may be accomplished by just maintaining the face sheet forming gas in a pressure range, since face sheet forming is rarely critical. The inert gas causes the face sheets to gradually assume the shape of the die in which the assembly has been placed. A slightly higher pressure is applied to the second pressure line at the same time, so that a slight positive differential pressure appears between the sheets of the inner core to prevent the core sheets from diffusion bonding together during face sheet formation.

One strategically located pressure equalizing hole through a seam weld bead or a sealed area forming the face sheet forming pressure passage is generally sufficient for communication from one face sheet compartment to the next compartment. However, for structures made with thin sheets or with complex part geometry, additional strategically located holes prevent blockage of pressure communication and avoid trapped gas to prevent incomplete forming and incomplete diffusion bonding.

When the face sheets have been formed, controlled gas-mass flow is introduced into the inner core, while pressure between the inner core and the face sheets is maintained to keep the face sheets in proper position against the die. As the gas flows, the core sheets balloon outwardly between the intermittent welds. Since the volume between the face sheets and the core gradually reduces, inert gas therein is bled out of the first tube through a regulator to maintain face sheet securing pressure. The pressure remains equalized on the face sheets and about the core by flowing through the equalization holes until late in the diffusion bonding portion of the process when no equalization flow is required through the core. While controlled gas-mass flow is being used, the pressure being exerted is monitored. The pressure characteristically rises faster toward the end of the core forming process to indicate that no more expansion of the core sheets is occurring, at which time the pressure at the first tube can be relieved to lower pressure. When the process is complete, an SPF/DB panel results, which has perpendicular webs between the face sheets. Any gas passage hole through a web will remain open throughout the final formation of the web as the core sheets wrap around the weld bead.

Therefore, it is an object of the present invention to improve upon standard SPF/DB multiple sheet processes.

Another object is to reduce the cost of forming SPF/DB panels having four or more initial sheets.

Another object is to speed up SPF/DB multiple sheet processes by eliminating the need for manual welding.

Another object is to improve the formation of face sheets in an expanding core SPF/DB panel forming process.

These and other objects and advantages of the present invention will become apparent to those skilled in the art after considering the following detailed specification, together with the accompanying drawings wherein:

BRIEF DESCRIPTION OF THE DRAWINGS

FIG. 8 is a perspective view of two pairs of the core sheets of FIG. 7 as they are welded together to form a core assembly for the panel of FIG. 5 with the pressure equalizing holes of the present invention formed there through;

FIG. 19 is a perspective view of one of the two inner core sheets used to form the structure of FIG. 18 with gas passages and the position of the webs of the rectangular cell structures to be formed shown;

FIG. 20 is a perspective view of one of two inner pairs of core sheets including the sheet of FIG. 19 used to form the structure of FIG. 18 with the circular welds holding them together shown;

FIG. 21 is a perspective view of two pairs of the core sheets of FIG. 20 as they are welded together to form a core assembly for the panel of FIG. 18 and the face sheets;

DETAILED DESCRIPTION OF THE SHOWN EMBODIMENTS

Figure 1:
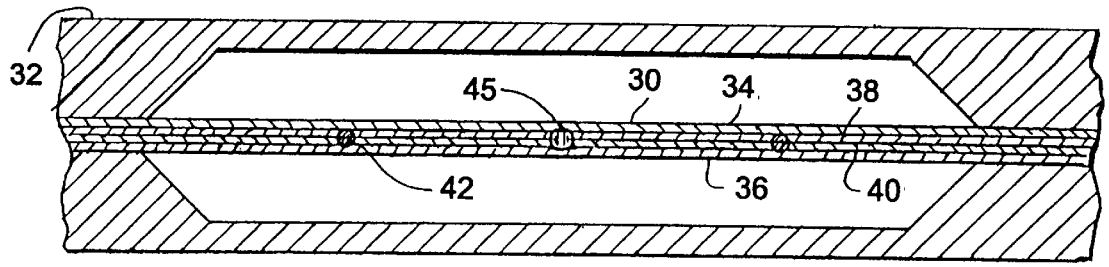
FIG. 1 is a cross-sectional view of a four-sheet assembly employing the present invention for constructing an SPF/DB panel in place in a heated die prior to the application of pressure.

Referring to the drawings more particularly by reference numbers, number 30 in FIG. 1 refers to a four sheet fabrication assembly positioned in a hot die 32 for the performance of a superplastic forming, diffusion bonding (SPF/DB) process. The assembly 30 includes upper and lower face sheets 34 and 36 and upper and lower inner core sheets 38 and 40. The material of the sheets 34, 36, 38, and 40 to be superplastically formed must exhibit the characteristic of unusually high tensile elongation with minimum necking when formed within a limited temperature and strain rate range. Titanium alloys are the preferred sheet material although some other alloys are also superplastically formable. The superplastic temperature range varies with the specific alloy used. This temperature for most titanium alloys is between 1400° F. and 1750° F. The strain rate is easily regulated by controlling the gas-mass flow rate used to form the sheets. If the strain rate is too high the sheet material being formed will blow out, and if the rate is too low, the material looses some of its plasticity, and the process costs are increased by excessive labor and energy usage and the reduced production availability of expensive hot press resources.

The material of the sheets 34, 36, 38, and 40 also must be suitable for diffusion bonding. Diffusion bonding refers to the solid state joining of surfaces of similar or dissimilar metals by applying heat and pressure for a time duration long enough to cause co-mingling of the atoms at the joint interface. This is distinguished from fusion bonding or welding, which is the metallurgical joining or welding of surfaces of similar or dissimilar metals by applying enough heat to cause the materials at the joint interface to reach liquid states and thereby merge into an integral solid when cooled.

Figure 2:
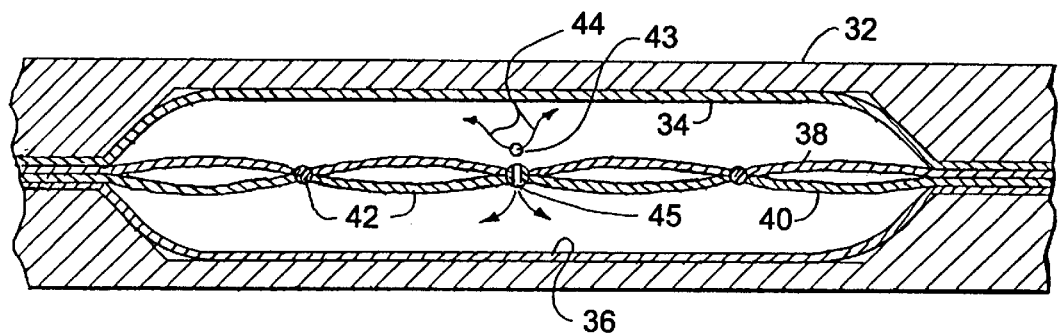
FIG. 2 is a cross-sectional view of the four-sheet assembly of FIG. 1 where the face sheets thereof are just about formed into their final position within the die, the gas to do so being distributed by means of the present invention.

The assembly 30 of FIG. 1 has its core sheets 38 and 40 connected by linear seam welds 42, at least part of which are intermittent to allow gas flow along the mating surfaces of the sheets 38 and 40. To perform the forming and bonding process, the assembly 30 is heated to approximately 1650° F. for the most common Ti-6Al-4V alloy and pressurized inert gas is introduced between the sheets 34, 36, 38, and 40 of the assembly 30 through a tube 43 that is shown passing though face sheet 34 in FIG. 2. The gas, shown by arrows 44, equalizes by passing through a hole 45 drilled or otherwise formed through the sheets 38 and 40, with the hole 45 being centered in a weld bead 42. One or more holes 45 may be present to assure pressure equalization. Prior similar processes use a bifurcated tube that passes through sheets 34 and 36. At times, one of the bifurcated passages clog and the face sheets forming the envelope expand asymmetrically. Although this tends to happen at the end of the face sheet forming process, the impact is to shift the core sheets 38 and 40 toward one or the other face sheet 38 or 40 causing asymmetry in the finished part. Since the inert gas 44 is constantly flowing through the hole 45, the hole 45 remains open as long as it is needed. The inert gas 44 at equalized pressure on the face sheets 34 and 36 causes the face sheets 34 and 3, to superplastically form outwardly into the shape of the die 32, as shown in FIG. 2. A slightly higher pressure is applied between the core sheets 38 and 40 through tube 46 so that they expand only a minimum amount and do not diffusion bond together while the face sheets 34 and 36 are being formed.

Figure 3:
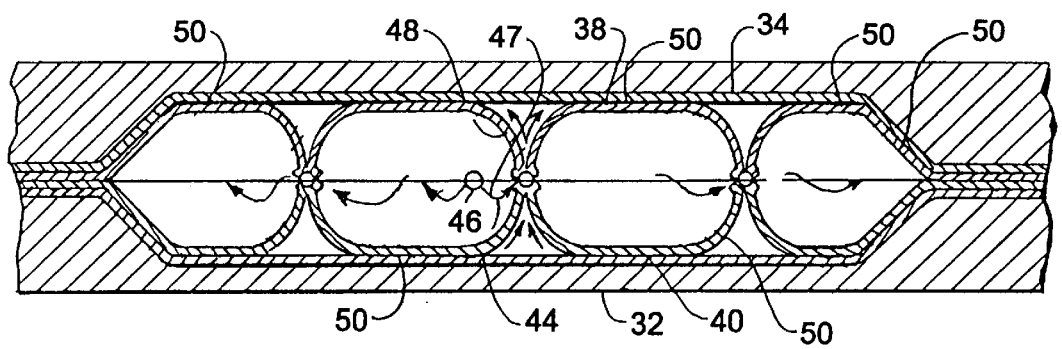
FIG. 3 is a cross-sectional view of the four-sheet assembly of FIGS. 1 and 2 where the core sheets thereof are being formed.
Figure 4:
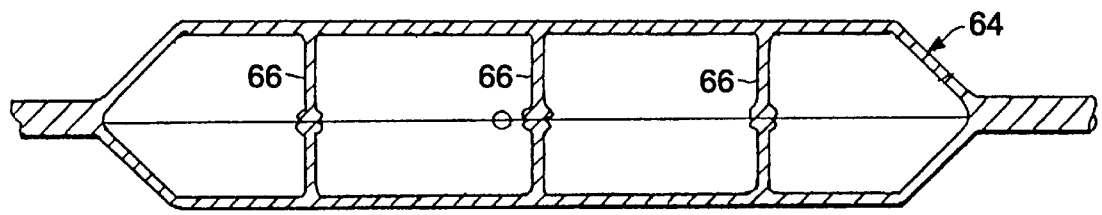
FIG. 4 is a view of the panel being formed in FIGS. 1, 2 and 3 after forming is complete.

Once the face sheets 34 and 36 have reached their final positions against the die 32, as shown in FIG. 3, the pressure of the inert gas 44 between the face sheet 34 and the core sheet 38 and the face sheet 36 and core sheet 40 is held at a value sufficient to maintain the face sheets 34 and 36 in position. Generally, about 50 psi is maintained with additional pressure being required when thick face sheets 34 and 36 are used. Thereafter sufficient pressurized inert gas 47 is introduced through the tube 46 between the core sheets 38 and 40 to cause them to balloon outwardly except where connected together by the intermittent linear seam welds 42. If, for example, the inert gas 47 is introduced through the tube 46 at the back of longitudinal "balloon" 48, the gas 47 travels through openings formed by the intermittent portions of the welds 42 to pressurize all of the other balloons 50. The flow of inert gas 47 is continued until the balloons 48 and 50 engage each other and the face sheets 34 and 36, to form the panel 64 with vertical webs 66 shown in FIG. 4. The hole 45 becomes very small in diameter as the core sheets 38 and 40 complete their diffusion bonding, but remains open because of an almost infinitely small radius.

Figure 5:
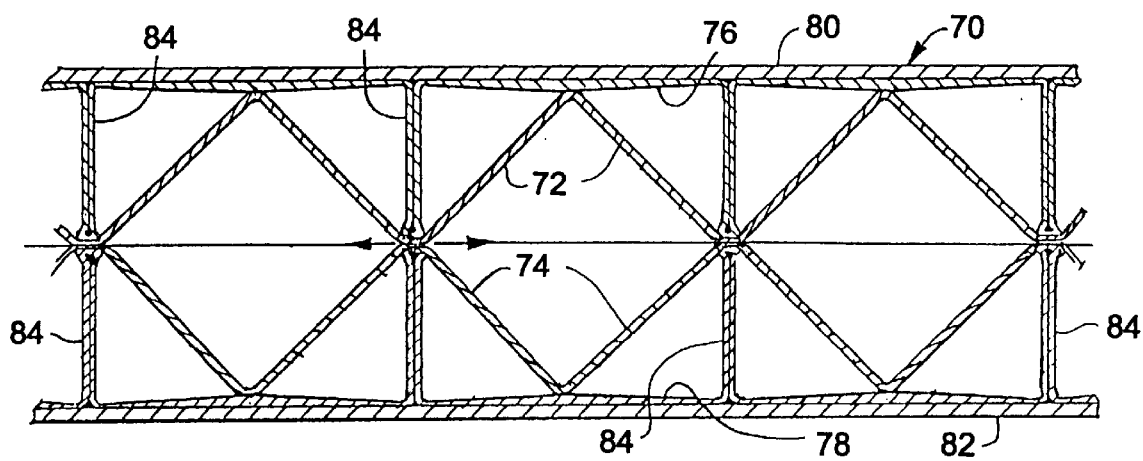
FIG. 5 is a cross-sectional view of an SPF/DB six-sheet panel structure with diagonal reinforcing webs constructed with the present invention.

The present invention is also useful in the construction of more complex panels, such as the diagonally reinforced web SPF/DB panel 70 shown in FIG. 5. The panel 70 is similar to panel 64 except that two additional core sheets 72 and 74 are added to the assembly 30 between core sheets 76 and 78 and face sheets 80 and 82, resulting in a six sheet process. The core sheets 72 and 74 form diagonal webs to create an efficient panel 70, much more resistant to shear loads than panels 64 that have only vertically positioned parallel webs 66 when the forming waste thereof is trimmed away.

Figure 6:
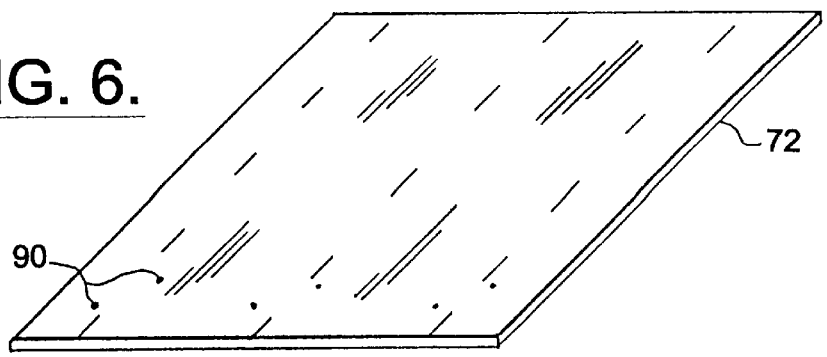
FIG. 6 is a perspective view of one of the two inner core sheets used to form the structure of FIG. 5 with gas passages and the position of the webs of the longitudinal cell structures to be formed shown.
Figure 7:
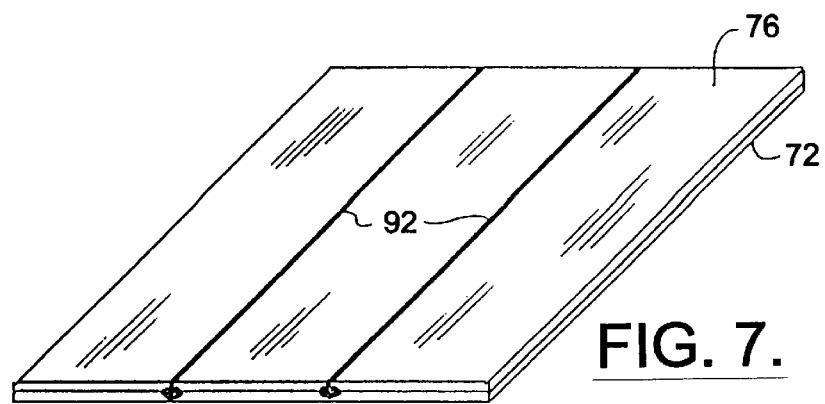
FIG. 7 is a perspective view of one of two inner pairs of core sheets including the sheet of FIG. 6 used to form the structure of FIG. 5 with the welds holding them together shown.
Figure 8:
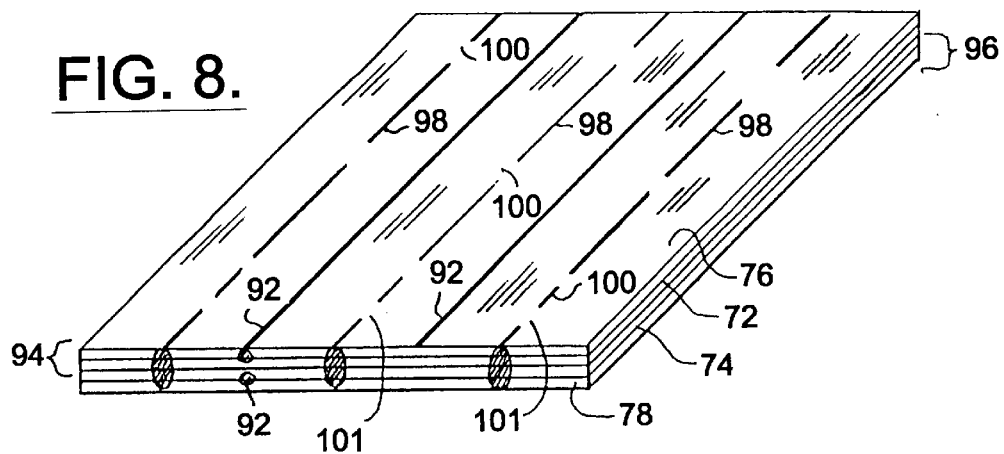

Various configurations of diagonally reinforced SPF/DB panel structures are possible. The basic fabrication process is relatively simple and similar to other multi-sheet SPF/DB panels. The panel 70 is constructed by first forming gas passageways 90 in core sheets 72 and 74 as shown with sheet 72 in FIG. 6. Thereafter as shown in FIG. 7, core sheets 72 and 76 and 74 and 78 are rollseam welded together. The rollseam welds 92 so created become the diagonal web attachment lines at the face sheets after forming. As shown in FIG. 8, the two welded subassemblies 94 and 96 made from sheets 72 and 76, and 74 and 78 respectively, are placed on top of each other with the weld lines 92 aligned. The subassemblies 94 and 96 are then intermittently rollseam welded together to create intermittent welds 98, which become the centers of vertical web locations. The interruptions 100 in the welds 98 become gas passages during the forming process that allow gas pressure to propagate throughout the interior of the panel 70. One or more face sheet pressure equalization holes 101 are drilled through the center of the welds 98 to provide gas passages at right angles to the weld interruption gas passages 100 from face sheet 80 to face sheet 82 through the core assembly 102.

Figure 9:
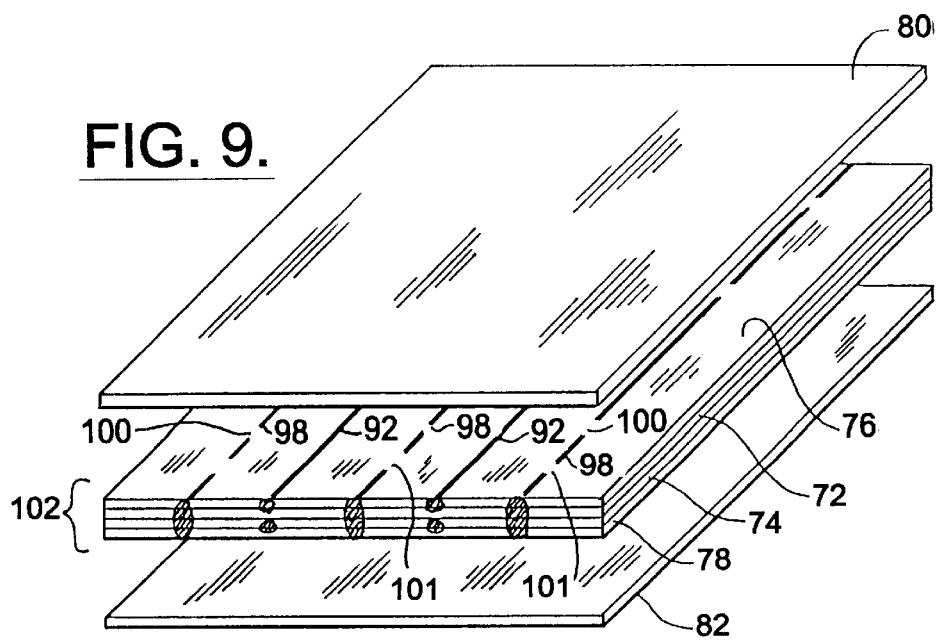
FIG. 9 is a perspective view showing how the face sheets are assembled to the welded core assembly of FIG. 8.
Figure 10:
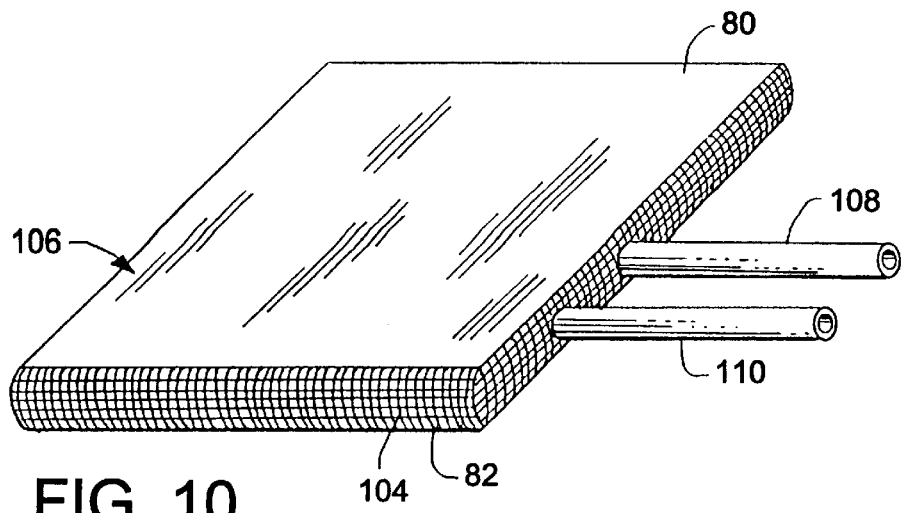
FIG. 10 is a perspective view of the panel assembly used to form the panel of FIG. 5.
Figure 11:
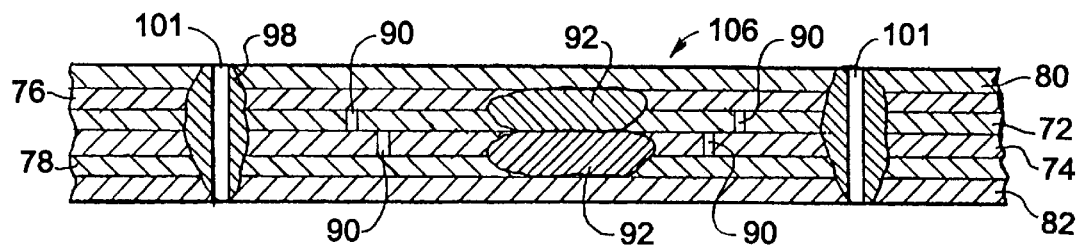
FIG. 11 is an enlarged cross-sectional view of a portion of the panel assembly of FIG. 10 with uni-directional cells.
Figure 12:
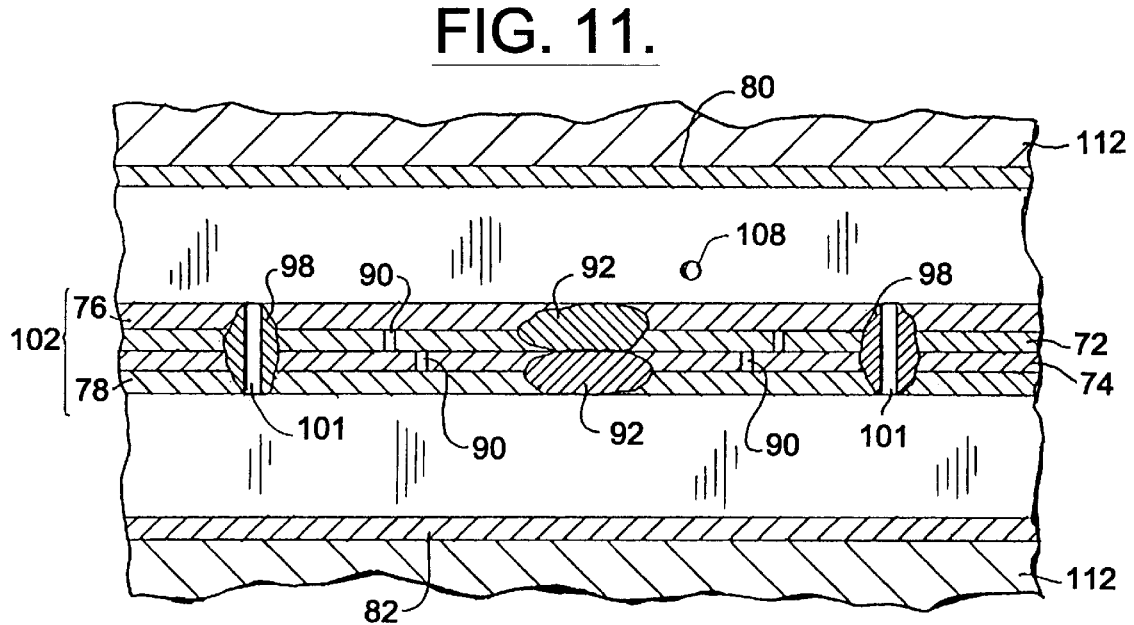
FIG. 12 is a cross-sectional view of the portion of the panel assembly of FIG. 11 in a hot die with the face sheets formed.
Figure 13:
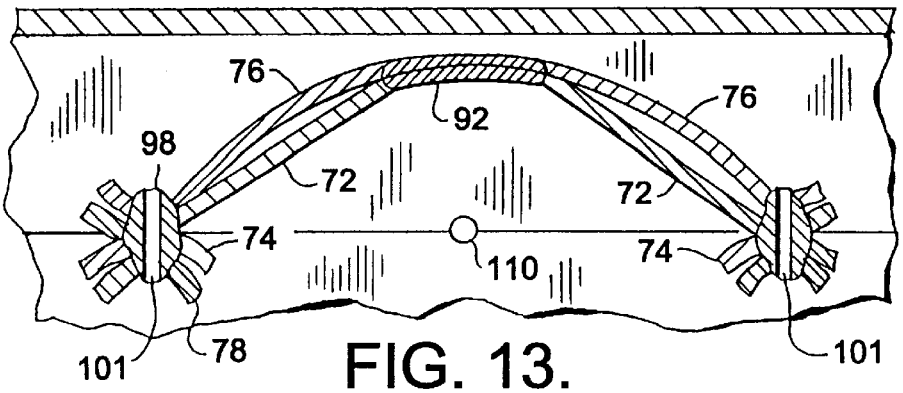
FIG. 13 is a cross-sectional view of the upper half of the portion of the panel assembly of FIG. 12 with the inner core partially formed.
Figure 14:
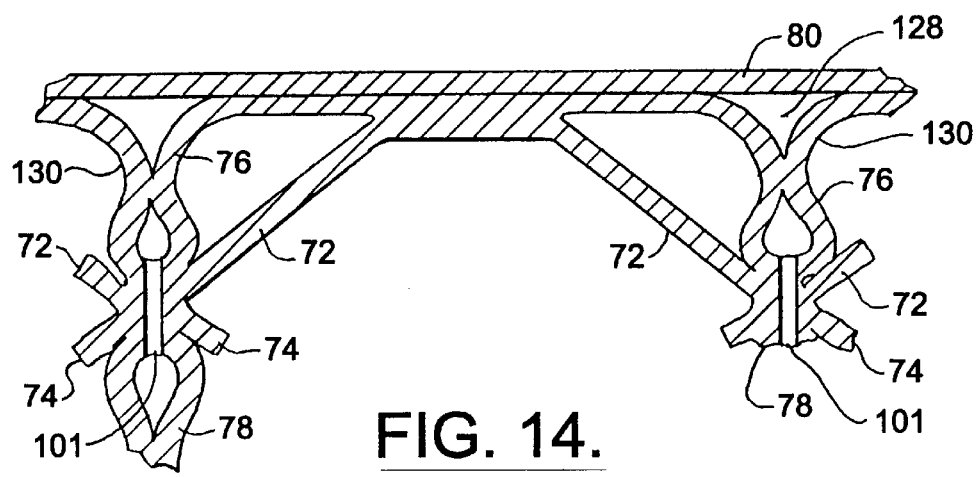
FIGS. 14 and 15 are a cross-sectional view similar to FIG. 13 illustrating the core forming.
Figure 15:
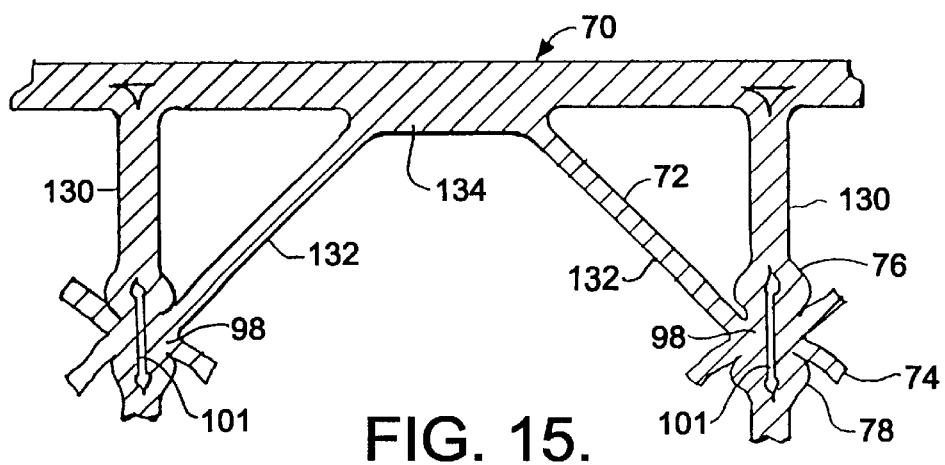

As shown in FIG. 9, the face sheets 80 and 82 are then added to the core assembly 102. As shown in FIG. 10, the edges 104 of the complete panel assembly 106 are then sealed by welding. As shown, two gas transmission tubes, 108 and 110, are positioned and welded to extend out of the edges 104 during the edge closing weld process. However, it is possible to provide dies with internal gas passages that seal to the panel assembly 106 to eliminate the need for any tube welding, and when used with such dies, the present invention becomes particularly advantageous. As shown, tube 108 provides a gas passageway into the volume between either the face sheet 80 or 82 and the core assembly 102, which is in gas communication to the other face sheet/core assembly volume through the hole 101, while tube 110 forms a gas passageway to the interior of the core assembly 102. The welded panel assembly 106, an enlarged portion being shown in FIG. 11, is then placed in a forming die and superplastically formed and diffusion bonded in a hot press. This accomplished by first heating the assembly 106 and then introducing pressurized inert gas between the face sheets 80 and 82 and the core assembly 102, which causes the face sheets 80 and 82 to form equally out against the die 112 because the pressure equalizes through the holes 101 as shown in FIG. 12. The interior of the core assembly 102 is also pressurized to just above the face sheet forming pressure during the period of face sheet formation to prevent the sheets 72, 74, 76 and 78 from undesirably diffusion bonding together. Thereafter, the pressure between the face sheets 80 and 82 and the core assembly 102 is maintained by bleeding off inert gas while a controlled gas-mass flow of inert gas is fed through tube 110 to pressurize the interior of the core assembly 102. This causes sheets 76 and 78 to superplastically form outwardly as shown in FIG. 13 while sheets 72 and 74 are strained laterally and maintained planar as shown. The welds 92 tend to stiffen the outer areas of the ballooning sheet 76 and as can be seen in FIG. 13, the welds 92 curve only slightly. FIGS. 14 and 15 show the vertical webs 130 symmetrically forming and diffusion bonding into planar vertical webs 130 with diagonal planar supporting webs 132 extending from the weld area 98 to the face sheet 80 until, as shown in FIGS. 15 and 16, all of the sheets diffusion bond together into the integral panel 70.

Figure 17:
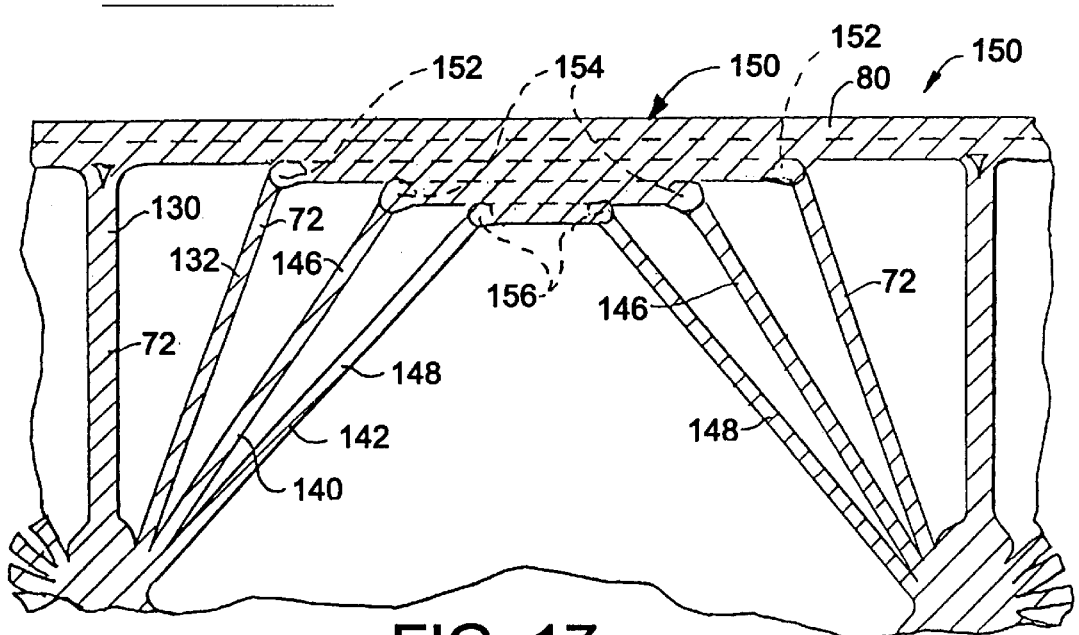
FIG. 17 is a cross-sectional view similar to FIG. 15 of a modified structure having multiple diagonal reinforcing webs.

By adding additional diagonal web sheets 140 and 142 through the center of the original core assembly and extending the holes 101 through them as well, additional diagonal reinforcing webs 146 and 148 can be formed to generate the panel 150, a portion of which is shown in FIG. 17. To obtain the needed separation at the face sheet 80, the new sheets 140 and 142 are welded to the outer core sheet 76 with spaced welds 152, 154, and 156, whose spacing is reduced as shown in FIG. 17 to provide separation.

Figure 16:
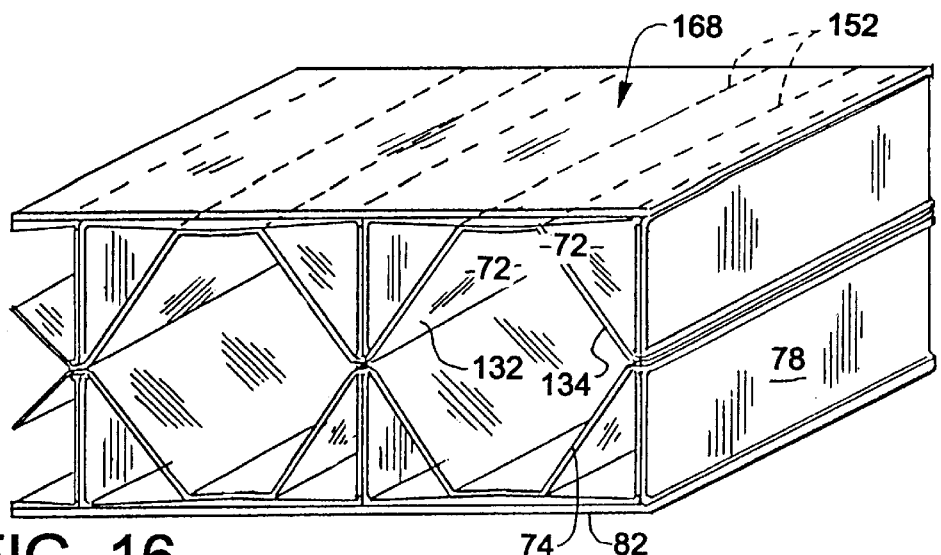
FIG. 16 is a perspective cross-sectional view of a panel structure of FIG. 15 constructed according to the present invention.
Figure 18:
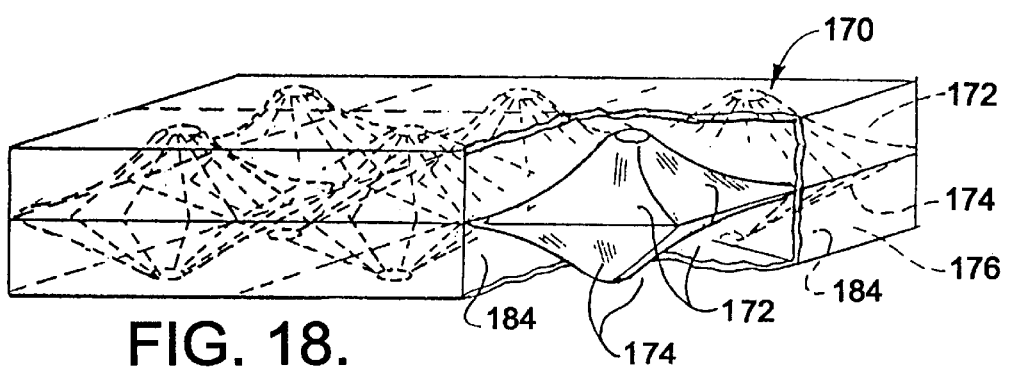
FIG. 18 is a perspective partial cross-sectional view of a panel structure constructed according to the present invention with rectangular cells being formed between longitudinal and transverse ribs with truncated pyramidal-shaped reinforcing webs in each of the cells.

If instead of the panel 70 with uni-directional cells as shown in FIG. 16, a panel with bidirectional cells is required, then the panel 170 shown in FIG. 18 can be constructed where the diagonal reinforcing webs 172 and 174 in each cell 176 are in the form of truncated, pyramidal shaped webs. The construction of the panel 170 is similar to the construction of the panel 70. The inner core sheets 180 and gas passages 182 are placed so there is at least one hole 182 in each location where a cell 184, will be constructed (FIG. 19). As before, inner core sheets 180 are welded to outer core sheets 186 except that instead of being welded with a linear seam, the welds 188 are symmetrical and are located centrally at what will be the top and bottom of each cell 184, as shown in FIG. 20.

As shown in FIG. 21, the inner and outer core sheets 180 and 186 are then welded together at what will become the edges of the cells 184 and face sheets 190 and 192 are applied. One or more pressure equalizing holes 193 are provided through any location on the welds 194 although drilling them at the intersections 195 where the chance that the holes 193 will remain open is the greatest and the area that will diffusion bond together last, is recommended. The sides are then welded together and the forming process previously described is performed resulting in the truncated, pyramidal webs 172 and 174.

Figure 22:
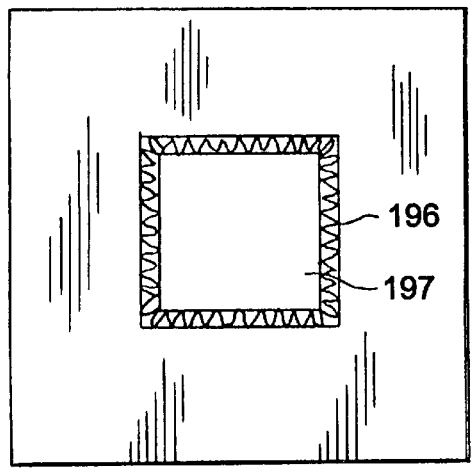
FIG. 22 is an enlarged detail view of a modified structure with a rectangular weld.

Although the welds 188 are shown as circular, as shown in FIG. 22, the welds 188 may be comprised of welds 196 about the edge of a square 197. The welds 196 result in a truncated pyramid with less rounding at its apex.

Figure 23:
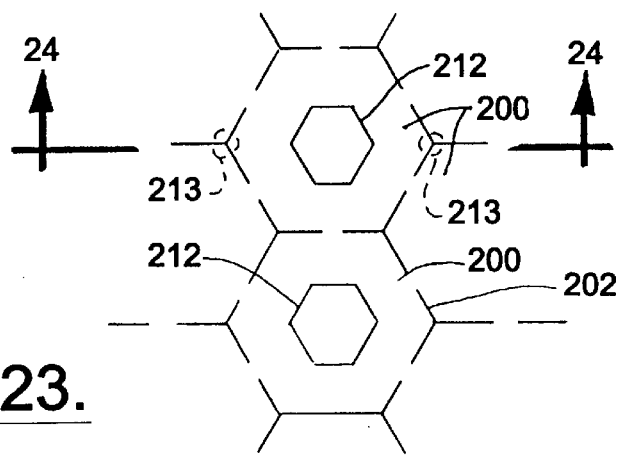
FIG. 23 is an enlarged detail view of a hexagonal cell structure that usually requires an automated welder to form.
Figure 24:
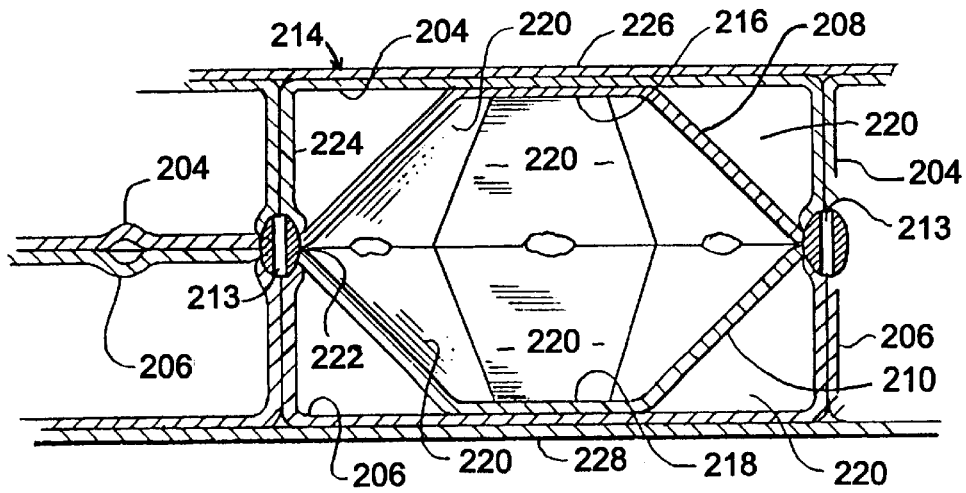
FIG. 24 is a cross-sectional view taken at lines 24—24 of FIG. 23.

As shown in FIGS. 23 and 24, hexagonal cells 200 can be formed using the six sheet process, although the relatively complex interrupted hexagonal weld pattern 202 between the outer core sheets 204 and 206 requires the use of automated welding apparatus. The inner core sheets 208 and 210 are welded to the outer core sheets 204 and 206 with a matching hexagonal edge weld 212 like welds 194. The face sheet pressure equalizing holes 213 are provided as in FIG. 21 at the intersections of the welds 202. The result is a reinforcing structure 214 formed from the inner core sheets 208 and 210 that has a hexagonal top 216 and bottom 218 and twelve symmetrical trapezoidal sides 220 that extend from the weld 212 to centers 222 of the hexagonal webs 224 supporting the diffusion bonded face sheets 226 and 228.

Figure 25:
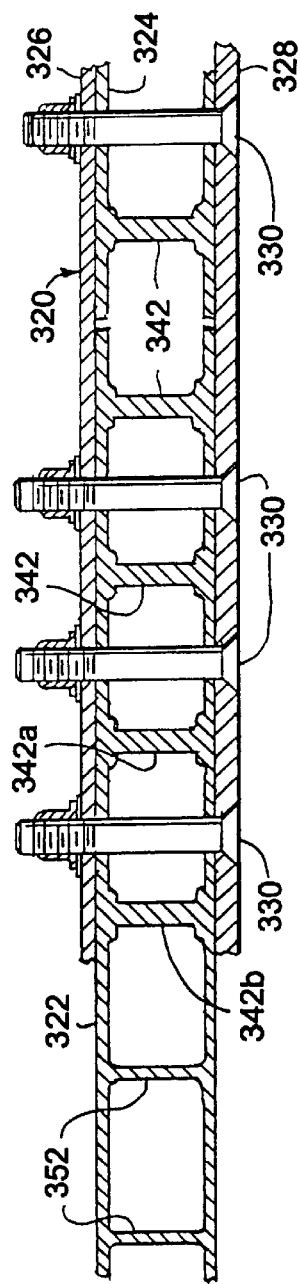
FIG. 25 is a cross-sectional view of a bolted joint between the edges of two doubler reinforced SPF/DB four-sheet panels.
Figure 26:
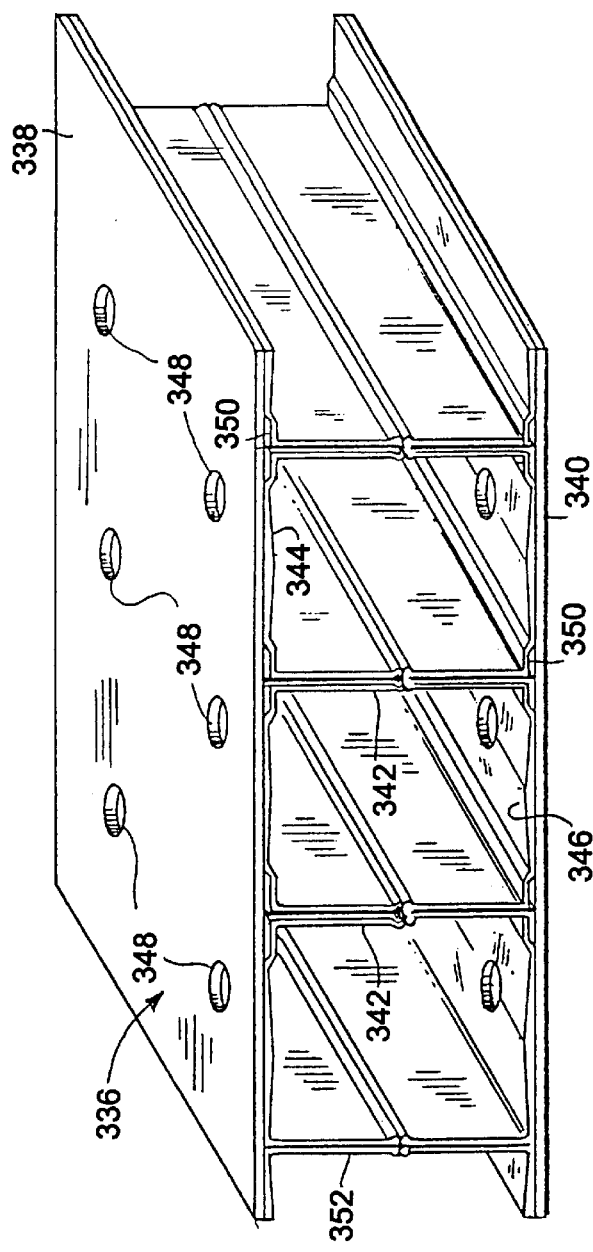
FIG. 26 is a perspective view of the four-sheet panel portion of FIG. 25 including reinforced webs so that the compression of the bolted joint can be accommodated.

The panel joint 300 shown in FIG. 25 includes two four sheet superplastically formed, diffusion bonded (SPF/DB) panels 322 and 324 held edge to edge by doubler plates 326 and 328 and suitable fasteners 330. The panels 322 and 324 are like the panel 336 shown in FIG. 26.

The panel structure 336, is shown with the sheets from which it is formed even though when the panel structure 336 is formed, all of the sheets are diffusion bonded together into an integral structure. The panel structure 336 includes parallel face sheets 338 and 340 with thick webs 342 made from core sheets 344 and 346 extending between the face sheets 338 and 340 in areas where holes 348 are drilled for fasteners used to produce the edge joint. Doubler strips 350 are included in the thick webs 342 to reinforce them while normal thinner webs 352 do not include the doubler strips 350.

Figure 27:
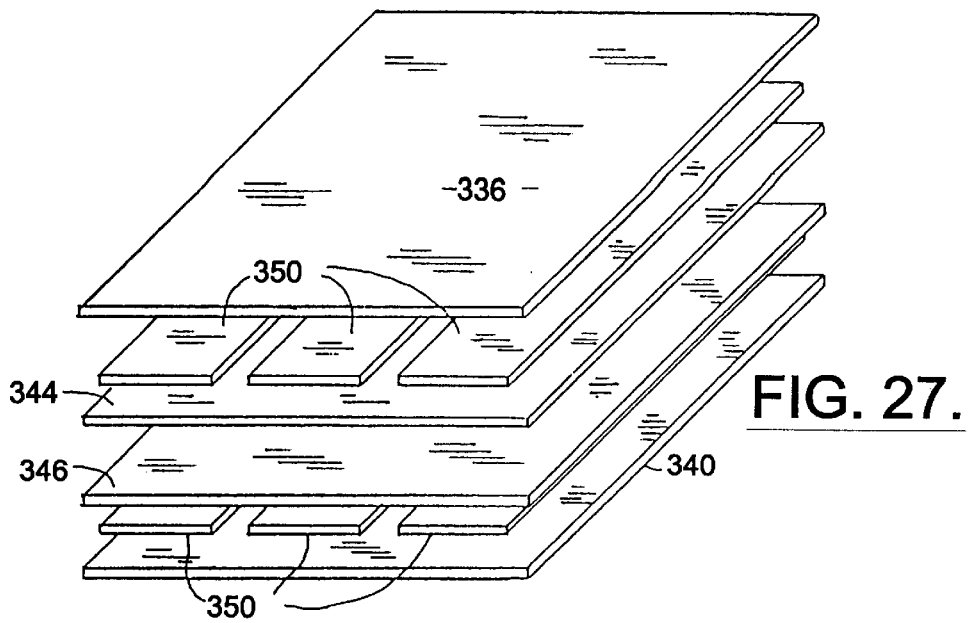
FIG. 27 is an exploded perspective view of a four-sheet pre-assembly with doubler strips, used to form the panel of FIG. 26.
Figure 28:
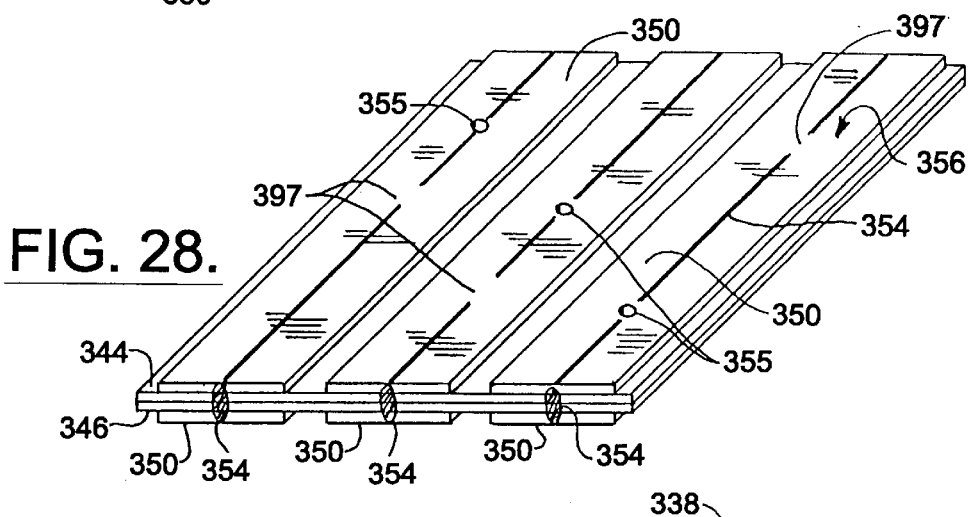
FIG. 28 is a perspective view of the welded core sheet assembly with doubler strips of FIG. 27.
Figure 29:
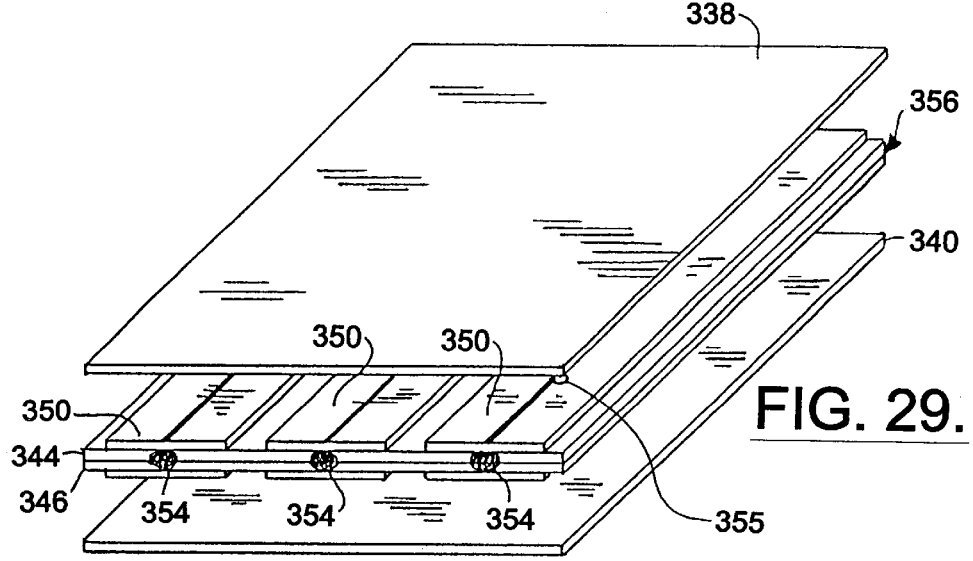
FIG. 29 is an exploded perspective view of the welded core sheet assembly of FIG. 28 in position between two face sheets.
Figure 30:
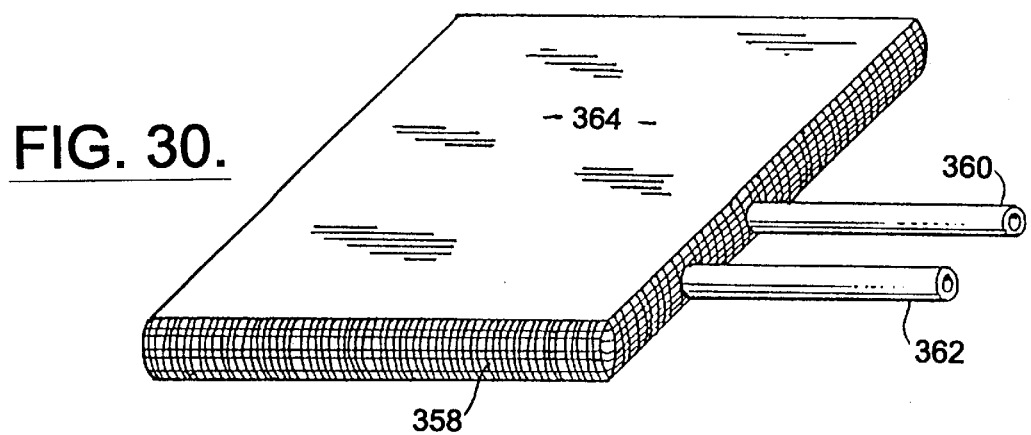
FIG. 30 is a perspective view of the assembly of FIG. 29 with its edges sealed by welding and with pressure tubes installed.
Figure 31:
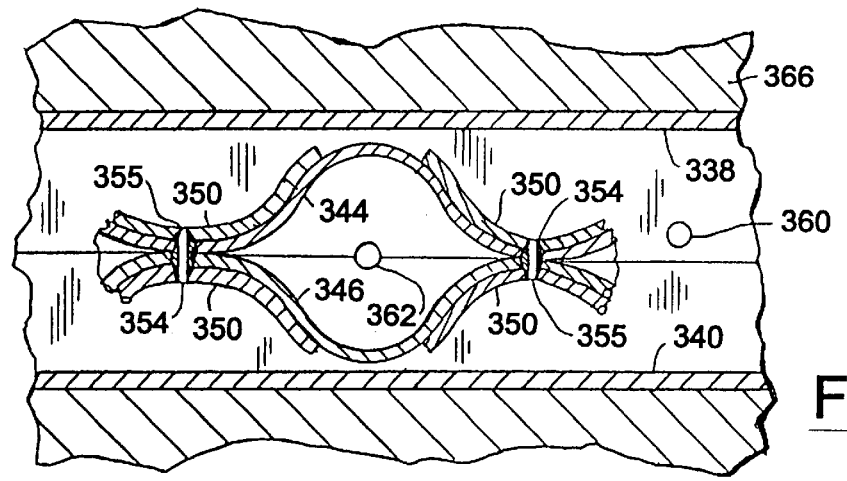
FIG. 31 is an enlarged cross-sectional view of a portion of the assembly of FIG. 30 as the panel is being formed.

To construct the panel structure 336, the face sheets 338 and 340, the core sheets 344 and 346 and the doubler strips 350 are assembled as shown in FIG. 27 with the core sheets 344 and 346 adjacent each other and the doubler strips 350 positioned outside the core sheets 344 and 346. As shown in FIG. 28, core sheets 344 and 346 and the doubler strips 350 are joined by linear welds 354 into a core assembly 356 created by means such as a rollseam welder. The welds 354 may be intermittent to allow gas flow between the mating surfaces of the core sheets 344 and 346. One or more pressure equalizing holes 355 are drilleded through the welds 354. The core assembly 356 is then positioned between the face sheets 338 and 340 (FIG. 29), and the edges 358 are welded (FIG. 30). A first tube 360 is welded in position through one of the face sheets 338 or 340 to transmit inert gas between the face sheets 338 and 340 and the core assembly 356, assisted by the pressure equalizer hole 355. A second tube 362 is connected through the edge 358 to transmit inert gas between the core sheets 344 and 346. The panel construction assembly 364 is then placed in a die 366 and heated to approximately 1650° F. Pressurized inert gas is introduced between the face sheets 338 and 340, and the core sheets 344 and 346. This causes the face sheets 338 and 340 to superplastically form outwardly as shown in FIG. 31 into the shape of the die 366. During expansion of the face sheets 338 and 340, a slightly higher pressure is applied between the core sheets 344 and 346 through tube 362 so that the core sheets 344 and 346 move only a minimum amount and do not diffusion bond together.

Figure 32:
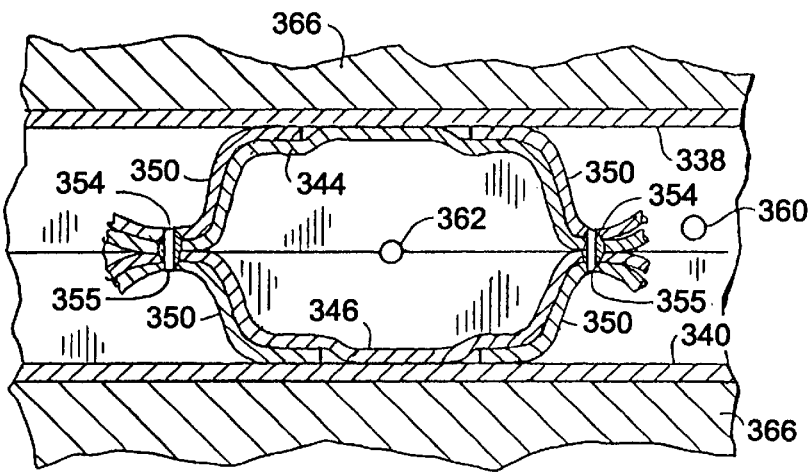
FIG. 32 is an enlarged cross-sectional view of the portion of the assembly of FIG. 30 as the panel is further along in its forming process than is shown in FIG. 31.
Figure 33:
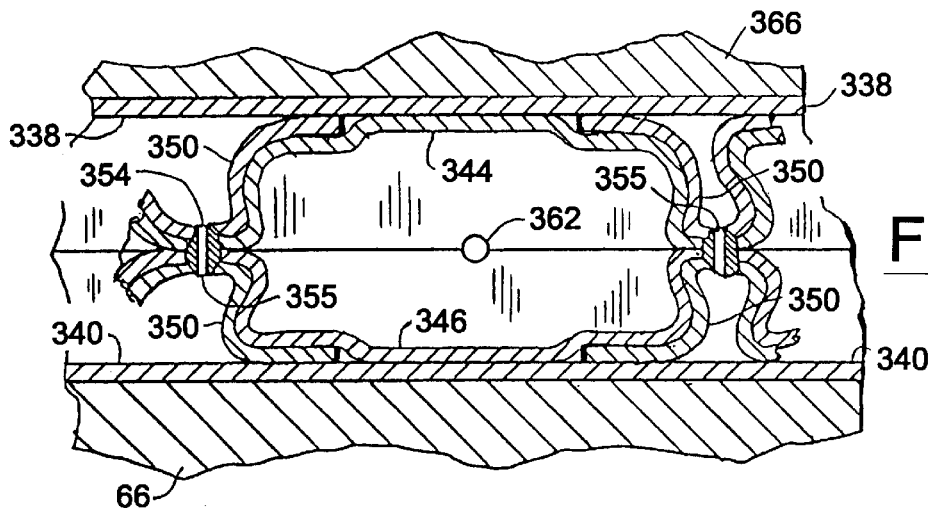
FIG. 33 is an enlarged cross-sectional view of the portion of the assembly of FIG. 30 as the panel is further along in its forming process than is shown in FIG. 32.
Figure 34:
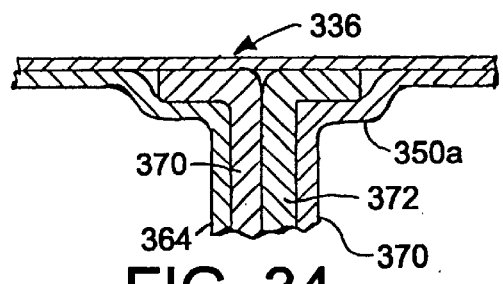
FIG. 34 is a detail cross-sectional view of a thick web portion having a thick doubler.
Figure 35:
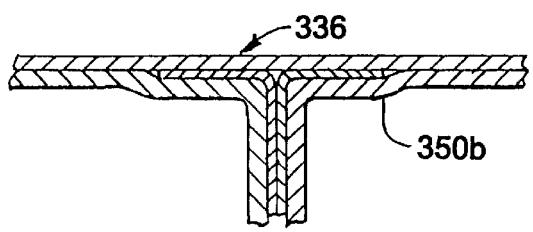
FIG. 35 is a detail cross-sectional view of a thick web portion having a relatively thin doubler.
Figure 36:
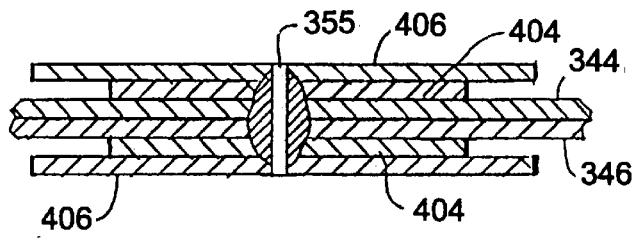
FIG. 36 is a cross-sectional view of a four doubler, two core sheet stack.
Figure 37:
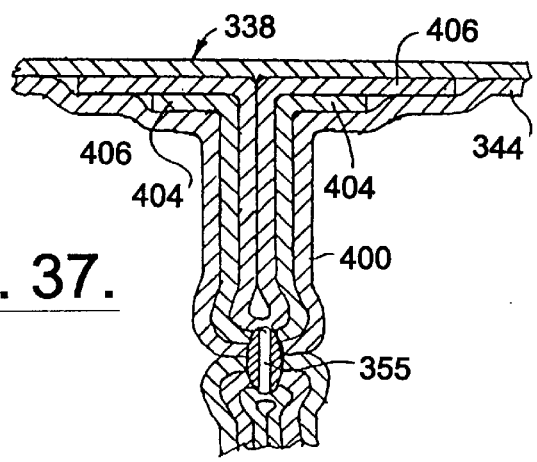
FIG. 37 is a cross-sectional view of a thick web portion resulting from the stack of FIG. 36.
Figure 38:
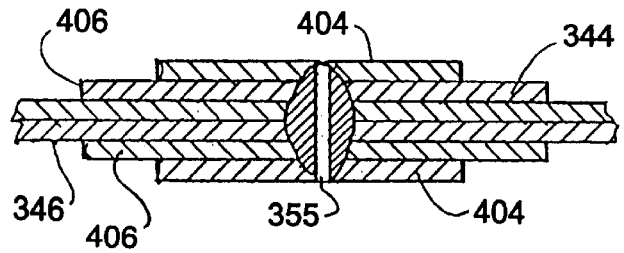
FIG. 38 is a cross-sectional view of a four doubler, two core sheet stack with the widths of the doublers reversed from the stack of FIG. 36.
Figure 39:
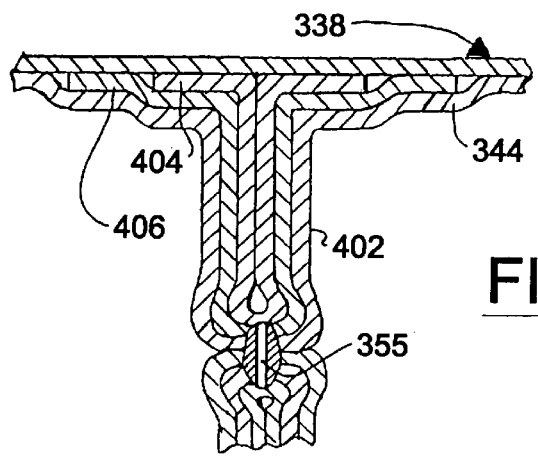
FIG. 39 is a cross-sectional view of a thick web portion resulting from the stack of FIG. 38.

Once the face sheets 338 and 340 have reached their final positions against the die 366, the pressure of the inert gas between the face sheets 338 and 340 and the core sheets 344 and 346 is held at a value sufficient to maintain the face sheets 338 and 340 in position. Generally, about 50 psi is maintained with additional pressure being required when thick face sheets 338 and 340 are used. Thereafter sufficient pressurized inert gas is introduced between the core sheets 344 and 346 to cause them and the doubler strips 350 to balloon outwardly except where connected together by the welds 354. As shown in FIGS. 32 and 33, the core sheets 344 and 346 and the doubler strips 350 continue to balloon outwardly until first the core sheets 344 and 346 and then the doubler strips 350 contact and diffusion bond to the face sheets 338 and 340. Since the doubler strips 350 must contact the face sheets 338 and 340 and become bonded thereto before webs are substantially formed, the width of the doubler strips 350 need to be about the expected height of the web 342 being formed, since each doubler strip doubles over and assists in forming half of a web 342 (shown in FIG. 26). This allows contact to be made with the face sheet 338 or 340 so that the doubler strips 350 form against the core sheet 344 or 346 as a web 342 is being formed. The core sheets 344 and 346, and the doubler strips 350 continue to balloon until the doubler strips 350 fold over the welds 354 with the core sheets 344 and 346 following to create the relatively thick webs 342 and relatively thin webs 352 where doubler strips 350 are not present. It is possible to tailor the thickness of the webs 342 by varying the thickness of the doubler strips 350, thereby avoiding excessive weight. For example, in the panel 322, webs 342a would be the thickest having a thick doubler strip 350a (FIG. 34), and the web 342b next to undoubted web 352, thinner, but including a thin doubler strip 350b (FIG. 35). This is useful in applications where different amount of compressive stress is applied to different areas of the panel structure 336 and where unneeded weight can not be tolerated.

As shown in FIGS. 36 through 39, thicker webs 400 and 402 may be constructed by including two doubler strips 404 and 406 having different widths. The web 400 is constructed by stacking the narrower doubler strips 404 adjacent the core sheets 344 and 346, while web 402 is constructed by stacking the wider doubler strips 406 adjacent the core sheets 344 and 346.

Figure 40:
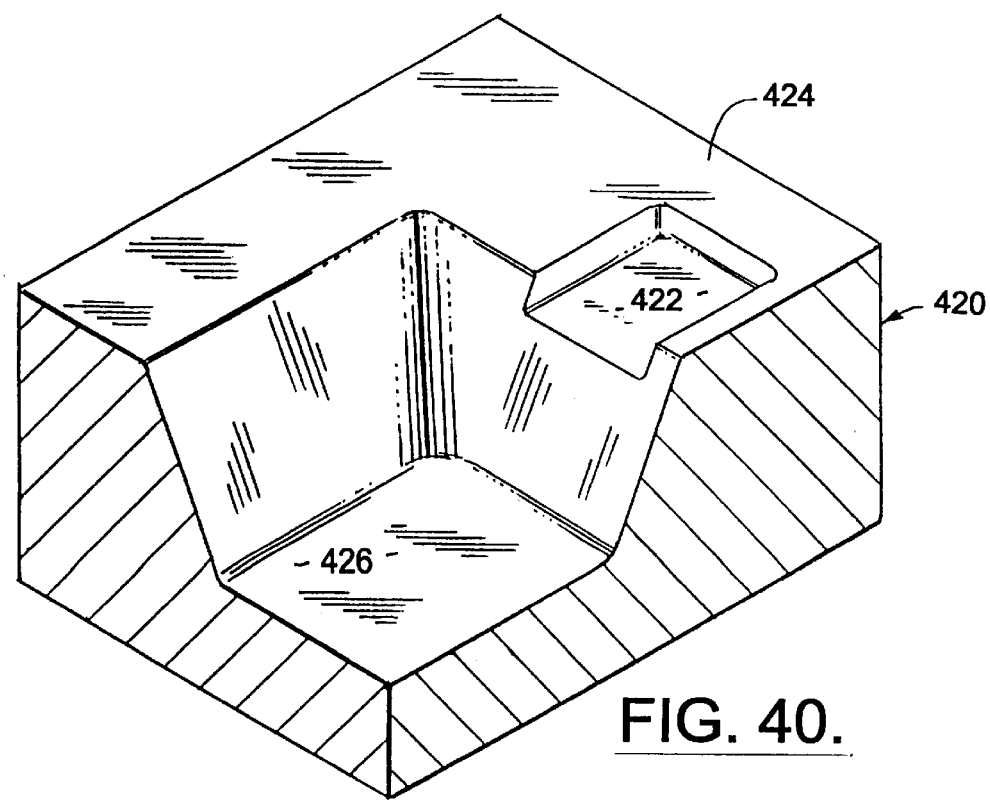
FIG. 40 is a cutaway perspective view of a die for practicing the present invention.
Figure 41:
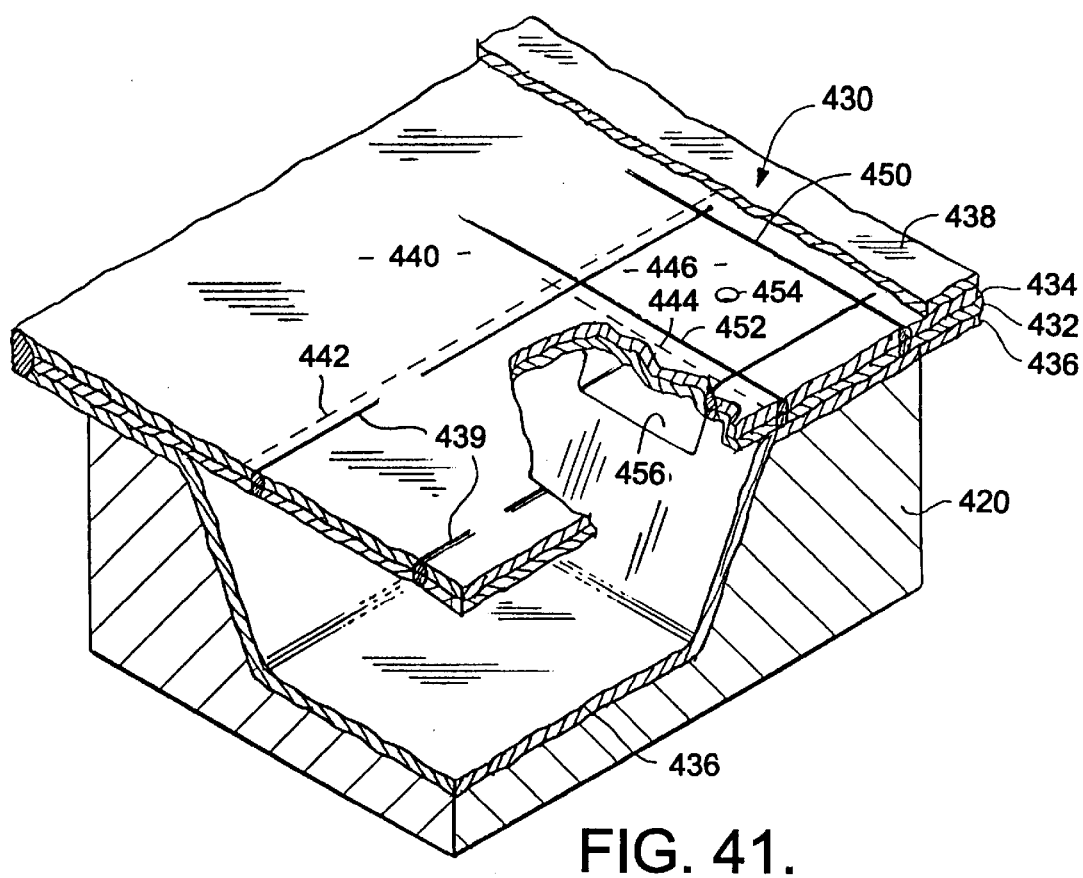
FIG. 41 is a cutaway perspective view of the die of FIG. 40 with an SPF/DB panel partially formed therein showing an embodiment of the present invention that uses a weld seal area in the waste portion of the part blank to provide the pressure equalizing communication hole.

The pressure equalization-holes can be located in a trim area of a panel when a suitable dies 420 such as shown in FIG. 40 are used. The die 420 includes a pressure relief in the outer edge surface 424 thereof that extends into the forming cavity 426 thereof. As shown in FIG. 41, a forming pack 430 including core sheets 432 and 434, and face sheets 436 and 438 are positioned on the edge surface 424 with seam welds 439 extending into the trim area 440 defined by cut lines shown as dashed lines 442 and 444. An area 446 between the welds 439 is sealed by two spaced welds 450 and 452 that extend across the welds 439. The pressure equalization hole 454 is drilled through the area 446 of the core sheets 432 and 434. When the face sheets 436 and 438 are formed in the die 420 and a matching die (not shown) including a pressure relief in the same area, a relief passage 456 is formed in the face sheet 436 to allow free gas flow through the pressure equalization hole 454 and about the core sheets 432 and 434. This way of providing pressure relief is particularly advantageous when the dies 420 also can seal the sheets 432, 434, 436, and 438 about their edges and include gas vents that seal to the forming pack 430. Then the only welds that need be made can be made are rollseam welds, which eliminates all peripheral and tube welding. This improvement can also be used when forming the multisheet core panels as shown in U.S. Pat. No. 5,141,146 by Yasui and in U.S. Pat. No. 5,204,161 by Pettit et al.

Thus, there has been shown novel SPF/DB processes which fulfill all of the objects and advantages sought therefor. Many changes, alterations, modifications and other uses and applications of the subject invention will become apparent to those skilled in the art after considering the specification together with the accompanying drawings. All such changes, alterations and modifications which do not depart from the spirit and scope of the invention are deemed to be covered by the invention which is limited only by the claims that follow.

I claim:

1. A method of superplastically forming and diffusion bonding a structural panel from two face sheets and at least two core sheets including:

welding first and second core sheets together to form at least one seam weld there between that establishes an area sealed by at least one seam weld;

forming at least one pressure equalizer hole through the area sealed by at least one seam weld;

positioning the welded first and second core sheets as a core assembly between first and second face sheets in a die;

heating the core assembly and face sheets to a superplastic and diffusion bonding temperature;

applying pressurized gas to a location between a face sheet and a core sheet, which equalizes through the pressure equalizer hole to stress the face sheets outwardly and to expand at least one face sheet outwardly into the die; and applying pressurized gas between the first and second core sheets to superplastically form and diffusion bond the first and second core sheets into webs extending between the first and second face sheets.

2. The method of superplastically forming and diffusion bonding a structural panel as defined in claim 1 including:

forming gas passages through first and second core sheets;

prior to welding the first and second core sheets together, welding a third core sheet to the first core sheet opposite the second core sheet together to form a first attachment;

prior to welding the first and second core sheets together, welding a fourth core sheet to the second core sheet opposite the first core sheet together to form a second attachment;

positioning the first, second, third, and fourth core sheets with the first and second attachments thereof in adjacent alignment; and welding the first, second, third, and fourth core sheets together when welding said first and second core sheets together so that the at least one seam weld is formed there between to establish the area sealed by at least one seam weld, the welding forming a core assembly with first and second sides formed by said third and fourth core sheets and so at least one seam weld there between that establishes an area sealed by the at least one seam weld; and positioning first and second face sheets respectively facing the first and second sides of the core assembly in a die, the resultant structure forming diagonal webs extending from the first attachment to the first face sheet from the third and fourth sheets.

3. The method of superplastically forming and diffusion bonding a structural panel as defined in claim 2 wherein the applying of pressurized gas between the first and second core sheets includes:

applying pressurized gas at a controlled gas-mass flow rate.

4. The method of superplastically forming and diffusion bonding a structural panel as defined in claim 2 wherein the welding of the core sheets together forms first and second seams equally spaced from the first and second attachments, the method further including:

welding the first, second, third, and fourth core sheets together to form third and fourth seams equally spaced from the first and second attachments at an angle to the first and second seams.

5. The method of superplastically forming and diffusion bonding a structural panel as defined in claim 4 wherein the first and second seams are formed parallel to each other and the third and fourth seams are formed perpendicular to the first and second seams.

6. The method of superplastically forming and diffusion bonding a structural panel as defined in claim 2 including:

choosing third and fourth core sheets of the same thickness that is smaller than the thickness of the first and second core sheets.

7. The method of superplastically forming and diffusion bonding a structural panel as defined in claim 1 wherein the welding of the core sheets together forms first and second seams spaced from each other, the method further including:

welding the first and second core sheets together to form third and fourth seams spaced from each other that run across the first and second seams to form the area sealed by the at least one seam weld there between.

8. The method of superplastically forming and diffusion bonding a structural panel as defined in claim 1 wherein the welding of the first and second core sheets together to form at least one seam weld includes:

welding first and second doubler members to the first and second core sheets at the same time, and wherein the forming at least one pressure equalizer hole through the area sealed by at least one seam weld includes:

forming the at least one pressure equalizer hole through the first and second doubler members also, the application of pressurized gas forming first portions of the first and second core sheets and the doubler members into webs extending generally perpendicular between the first and second face sheets, forming second portions of the first and second doubler members to thicken the first and second face sheets adjacent the webs, and forming second portions of the first and second core sheets over the doubler member second portions generally parallel to the first and second face sheets to thicken the first and second face sheets.

9. The method of superplastically forming and diffusion bonding a structural panel as defined in claim 8 wherein the applying of pressurized gas between the first and second core sheets includes:

applying pressurized gas at a controlled gas-mass flow rate.

10. The method of superplastically forming and diffusion bonding a structural panel as defined in claim 8 including:

choosing the width of the first and second doubler members to be at least the height of the webs between the first and second face sheets.

11. The method of superplastically forming and diffusion bonding a structural panel as defined in claim 8 wherein a third doubler member is included between the first core sheet and the first doubler member, and wherein a fourth doubler member is included between the second core sheet and the second doubler member, including:

forming the at least one pressure equalizer hole through the third and fourth doubler members also.

12. The method of superplastically forming and diffusion bonding a structural panel as defined in claim 11 wherein the third doubler member is wider than the first doubler member and the fourth doubler member is wider than the second doubler member.

13. The method of superplastically forming and diffusion bonding a structural panel as defined in claim 11 wherein the third doubler member is narrower than the first doubler member and the fourth doubler member is narrower than the second doubler member.

14. The method of superplastically forming and diffusion bonding a structural panel as defined in claim 10 including third and fourth doubler members that are thinner than the first and second doubler members, wherein the welding of the first and second core sheets together includes:

welding the first and second core sheets and the third and fourth doubler members together to form a core assembly with the order of third doubler member, first core sheet, second core sheet and fourth doubler member at locations different from those of the first and second doubler members, and wherein the forming of the at least one pressure equalization hole includes:

forming the at least one pressure equalizer hole through the third and fourth doubler members also.

15. A method of superplastically forming and diffusion bonding a structural panel from first and second face sheets, at least first and second core sheets, and at least first and second doubler grids including:

welding the first and second core sheets and the first and second doubler grids together in first seams in a first direction to form a core assembly with the order of first doubler grid, first core sheet, second core sheet and second doubler grid;

welding the first and second core sheets and the first and second doubler grids together in second seams in a second direction different than said first direction;

forming at least one pressure equalization hole through the first doubler grid, first core sheet, second core sheet and second doubler grid in a sealed area thereof;

positioning first and second face sheets respectively facing the first and second doubler grids in a die;

heating the core assembly and face sheets to a superplastic and diffusion bonding temperature;

applying pressurized gas from a location between the face sheets to expand at least one face sheet outwardly into the die; and applying pressurized gas between the first and second core sheets to superplastically form first portions of the first and second core sheets and the doubler grids into webs extending generally perpendicular between the first and second face sheets in the first and second directions, to superplastically form second portions of the first and second doubler grids to thicken the first and second face sheets adjacent the webs, and to superplastically form second portions of the first and second core sheets over the doubler grid second portions generally parallel to the first and second face sheets to thicken the first and second face sheets.

16. The method of superplastically forming and diffusion bonding a structural panel from first and second face sheets, at least first and second core sheets, and at least first and second doubler grids as defined in claim 15 wherein the at least one pressure equalization hole is formed at an intersection between the first and second seams.

17. A method of superplastically forming and diffusion bonding a structural panel from two face sheets and at least four core sheets including:

forming gas passages through second and third core sheets;

welding first and second core sheets together to form a first seam;

welding third and fourth core sheets together to form a second seam;

positioning the first, second, third, and fourth core sheets with the second and third sheets adjacent each other with the first and second seams thereof in alignment;

welding the first, second, third, and fourth core sheets together to form third and fourth seams equally spaced from the first and second seams to form a core assembly with first and second sides;

forming a pressure equalization hole through the third seam;

positioning a first face sheet facing the first side of the core assembly;

positioning a second face sheet facing the second side of the core assembly;

heating the core assembly and face sheets to a superplastic and diffusion bonding temperature;

applying pressurized gas between the first and fourth core sheets to superplastically form the first and fourth core sheets into webs extending generally perpendicular between the first and second face sheets and to diffusion bond the first and fourth core sheets thereto, to superplastically form the second core sheet into diagonal webs extending from the first seam to the third and fourth seams, and to superplastically form the third core sheet into diagonal webs extending from the second seam to the third and fourth seams.

18. The method of superplastically forming and diffusion bonding a structural panel from two face sheets and at least four core sheets as defined in claim 17 wherein the first and second seams are formed in the shapes of a rectangle, wherein the welding of the first, second, third, and fourth core sheets together to form third and fourth seams include:

forming fifth and sixth seams at right angles to the first and second rectangular shaped seams equally spaced therefrom.

19. The method of superplastically forming and diffusion bonding a structural panel from two face sheets and at least four core sheets as defined in claim 18 wherein the first and second seams are formed in a hexagonal shape, wherein the welding of the first, second, third, and fourth core sheets together to form third and fourth seams include:

forming the third and fourth seams with an hexagonal shape larger that the hexagonal shape of the first and second seams.

20. The method of superplastically forming and diffusion bonding a structural panel from two face sheets and at least four core sheets as defined in claim 17 wherein the forming of a pressure equalization hole through the third seam occur at in intersection between the third and fourth seams.

\* \* \* \* \*